US008561265B2

(12) United States Patent
Benedetti

(10) Patent No.: US 8,561,265 B2
(45) Date of Patent: Oct. 22, 2013

(54) INTERIOR TRIM FASTENER

(75) Inventor: Steven M. Benedetti, Sterling Heights, MI (US)

(73) Assignee: Newfrey LLC, Newark, DE (US)

( * ) Notice: Subject to any disclaimer, the term of this patent is extended or adjusted under 35 U.S.C. 154(b) by 121 days.

(21) Appl. No.: 13/084,761

(22) Filed: Apr. 12, 2011

(65) Prior Publication Data

US 2012/0261942 A1   Oct. 18, 2012

(51) Int. Cl.
*B60R 13/00* (2006.01)

(52) U.S. Cl.
USPC ............ 24/297; 24/458; 24/581.11; 411/508; 296/1.08

(58) Field of Classification Search
USPC ........ 24/297, 458, 581.11; 403/397; 411/508, 411/182, 337; 296/214, 1.08
See application file for complete search history.

(56) References Cited

U.S. PATENT DOCUMENTS

| | | | |
|---|---|---|---|
| 3,909,883 A | 10/1975 | Fegen | |
| 4,238,446 A | 12/1980 | Tanaka | |
| 5,035,560 A | 7/1991 | Watanabe et al. | |
| 5,173,026 A | 12/1992 | Cordola et al. | |
| 5,689,863 A | 11/1997 | Sinozaki | |
| 5,857,244 A | 1/1999 | Edwards et al. | |
| 6,039,523 A | 3/2000 | Kraus | |
| 6,752,950 B2 | 6/2004 | Clarke | |
| 6,916,145 B2 | 7/2005 | Lydan | |
| 7,198,315 B2 | 4/2007 | Cass et al. | |
| 7,481,474 B2 | 1/2009 | Higgins et al. | |
| 7,770,266 B2 | 8/2010 | Higgins et al. | |
| 2006/0099051 A1 | 5/2006 | Moerke | |
| 2011/0209309 A1* | 9/2011 | Camus | ............................ 24/458 |
| 2012/0131773 A1 | 5/2012 | DeGelis et al. | |

FOREIGN PATENT DOCUMENTS

| | | | | |
|---|---|---|---|---|
| FR | 2930976 A1 * | 11/2009 | ................ | F16B 2/24 |
| JP | 2001-355619 A | 12/2001 | | |
| JP | 2005-337330 A | 12/2005 | | |
| JP | 2008-057787 A | 3/2008 | | |
| WO | WO 2010-121718 A1 | 10/2010 | | |

OTHER PUBLICATIONS

International Search Report for International Application No. PCT/US2012/031953 mailed Oct. 16, 2012.
Written Opinion of the International Searching Authority for International Application No. PCT/US2012/031953 mailed Oct. 16, 2012.

* cited by examiner

*Primary Examiner* — Robert J Sandy
*Assistant Examiner* — Michael Lee
(74) *Attorney, Agent, or Firm* — Harness, Dickey & Pierce, P.L.C.

(57) ABSTRACT

A trim fastener includes a first fastener portion having a post, and first and second deflecting wings connected to an end of the post, each having a wing extending member, the first and second deflecting wings elastically deflectable toward the post. A second fastener portion connected to the first fastener portion includes a first resilient seal member. A second resilient seal member is integrally connected to a seal surface of the first resilient seal member. The second resilient seal member includes first and second wing enclosure portions connected to the wing extending members of the first and second deflecting wings. First and second through bores are oppositely positioned about the post. The first and second through bores temporarily collapse when receiving portions of the first and second wing enclosure portions when the first and second deflecting wings elastically deflect toward the post.

13 Claims, 6 Drawing Sheets

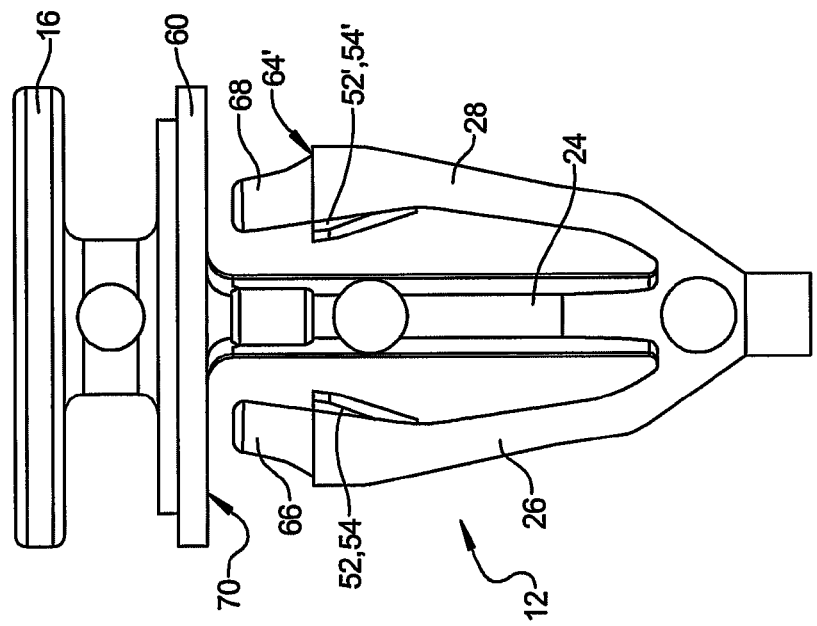
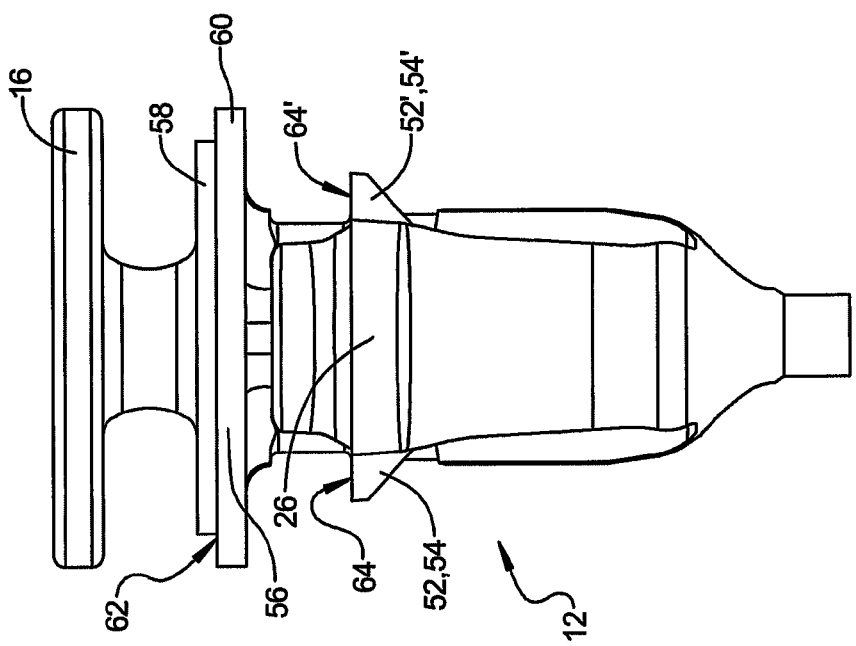

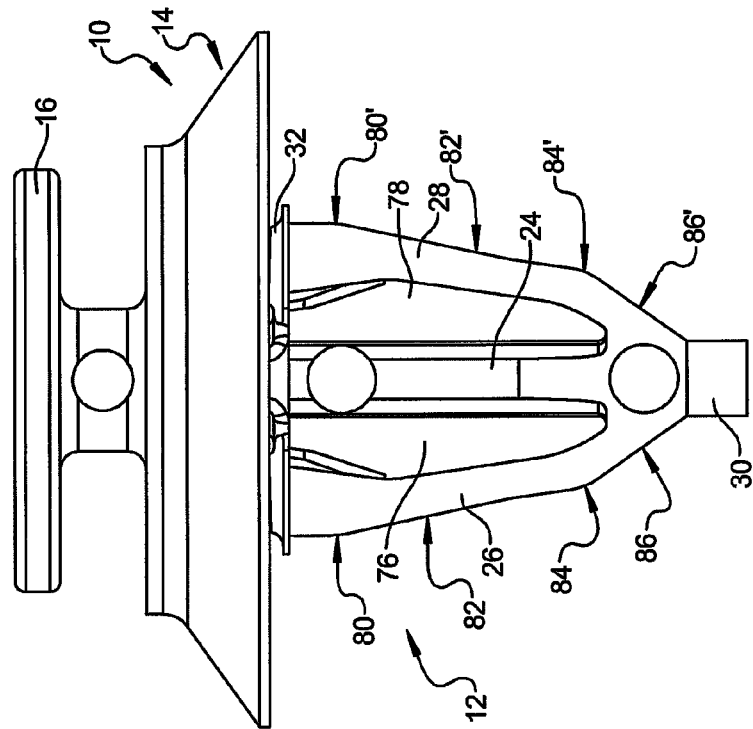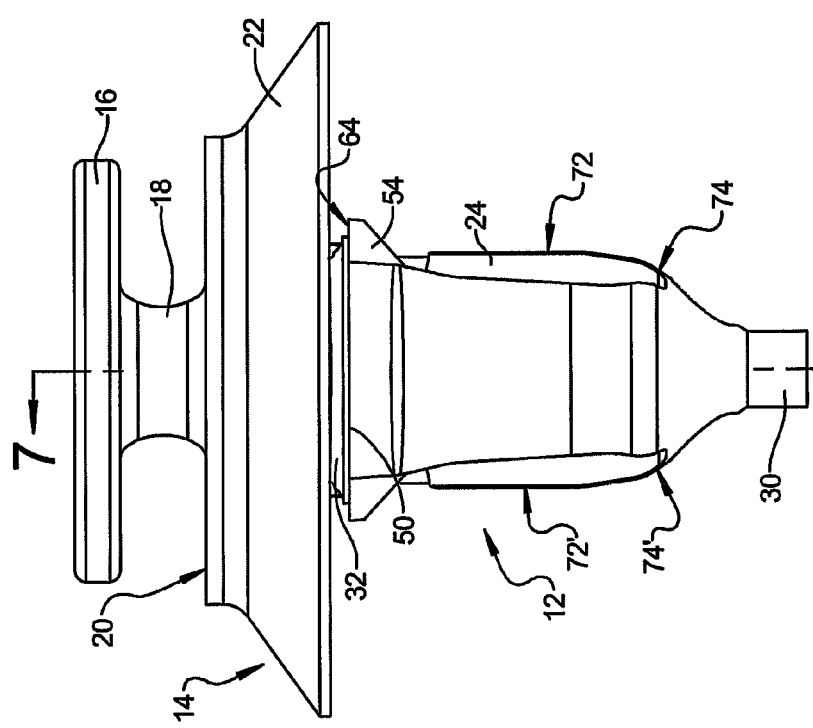

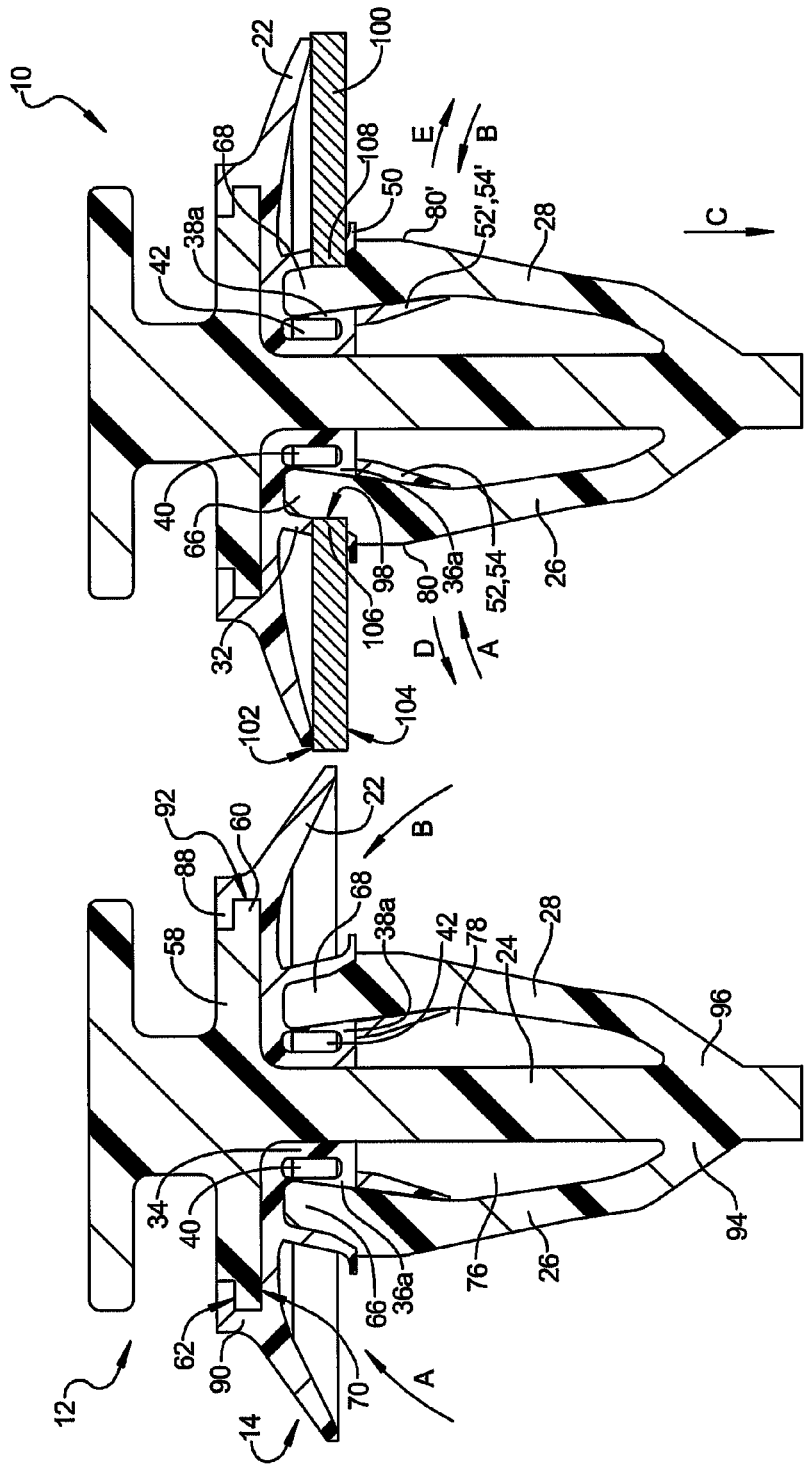

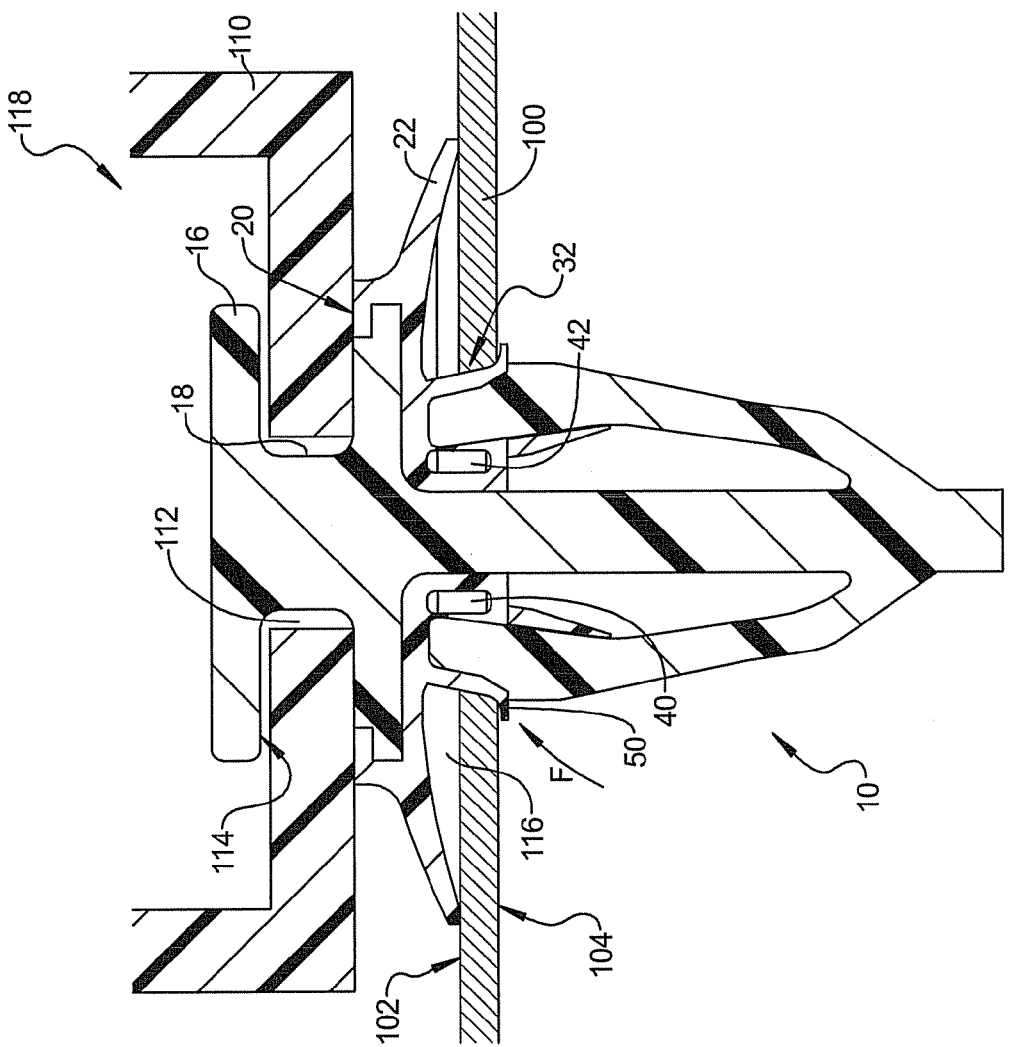

INTERIOR TRIM FASTENER

FIELD

The present disclosure relates to automobile vehicle trim fasteners.

BACKGROUND

This section provides background information related to the present disclosure which is not necessarily prior art.

Conventional polymeric fasteners or fasteners including combinations of polymeric elements and metal clips used to fasten members such as trim members to panels of automobile vehicles commonly include a seal member often referred to as an umbrella seal to provide a fluid seal or barrier at the aperture used in the panel to install the fastener. Umbrella seals provide adequate sealing capability for preventing fluid leakage from the side of the panel the seal contacts, but may not provide adequate sealing for fluid leakage coming from the opposite panel side. Deflectable wings used to retain the fasteners after installation commonly provide a leak path from the opposite panel side. Attempts to add a second seal at the opposite panel side have added threaded fasteners that pull opposed seal members toward the panel using the threads as the motive force. These designs require multiple fastener components which may become separated before fastener installation, are expensive to produce, and further, are labor intensive and therefore expensive to install.

SUMMARY

This section provides a general summary of the disclosure, and is not a comprehensive disclosure of its full scope or all of its features.

According to several embodiments, a trim fastener includes a first fastener portion having a component engagement head connected to a post. First and second deflecting wings are connected to an end of the post opposite to the head, each elastically deflectable toward the post and having a wing extending member facing the engagement head. A resilient material second fastener portion connected to the first fastener portion includes first and second wing enclosure elements connected to the wing extending member of each of the first and second deflecting wings. First and second through bores oppositely positioned about the post each temporarily receive a portion of one of the first and second wing enclosure elements when the first and second deflecting wings elastically deflect toward the post.

According to other embodiments, a trim fastener includes a first fastener portion having a post; and first and second deflecting wings connected to an end of the post, each having a wing extending member, the first and second deflecting wings elastically deflectable toward the post. A second fastener portion connected to the first fastener portion includes a first resilient seal member. A second resilient seal member is integrally connected to a seal surface of the first resilient seal member. The second resilient seal member includes first and second wing enclosure portions connected to the wing extending members of the first and second deflecting wings. First and second through bores are oppositely positioned about the post. The first and second through bores temporarily collapse when receiving portions of the first and second wing enclosure portions when the first and second deflecting wings elastically deflect toward the post.

According to additional embodiments, a trim fastener includes a first fastener portion having a post, and first and second deflecting wings connected to an end of the post, each having a wing extending member, the first and second deflecting wings elastically deflectable toward the post. A second fastener portion connected to the first fastener portion includes a first resilient seal member; and a second resilient seal member integrally connected to a seal surface of the first resilient seal member. The second resilient seal member includes first and second wing enclosure portions connected to the wing extending members of the first and second deflecting wings. First and second through bores are oppositely positioned about the post, each temporarily collapsing when receiving portions of the first and second wing enclosure portions when the first and second deflecting wings elastically deflect toward the post.

According to further embodiments, a trim fastener system includes a trim fastener connected to a vehicle panel. The trim fastener includes a first fastener portion having a post, and first and second deflecting wings connected to an end of the post, each elastically deflectable toward the post and having a wing extending member. An elastically compressible resilient material second fastener portion is connected to the first fastener portion. The second fastener portion includes first and second wing enclosure elements connected to the wing extending member of each of the first and second deflecting wing, and first and second through bores oppositely positioned about the post. The vehicle panel includes an aperture having a panel aperture wall. The first and second deflecting wings and the second fastener portion when in contact with the panel aperture wall during insertion into the aperture deflect elastically. The first and second through bores temporarily collapse to each receive a portion of one of the first and second wing enclosure elements during wing deflection. The first and second deflecting wings thereafter elastically return to a non-deflected condition after a wing maximum extension portion of each of the first and second deflecting wings passes through the aperture. The wing maximum extension portions thereafter frictionally retain the trim fastener in contact with the panel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a side elevational view of a first fastener portion of the fastener of FIG. 1;

FIG. 4 is a front elevational view of the fastener portion of FIG. 3;

FIG. 5 is a side elevational view similar to FIG. 3 showing the after-molded configuration adding a second fastener portion;

FIG. 6 is a front elevational view of the fastener of FIG. 5;

FIG. 7 is a cross sectional front elevational view taken at section 7 of FIG. 5;

FIG. 8 is a cross sectional front elevational view similar to FIG. 7, following fastener installation in a panel;

FIG. 10 is a cross sectional front elevational view similar to FIG. 8, further showing installation of a trim member.

Corresponding reference numerals indicate corresponding parts throughout the several views of the drawings.

DETAILED DESCRIPTION

Example embodiments will now be described more fully with reference to the accompanying drawings.

Figure 1:
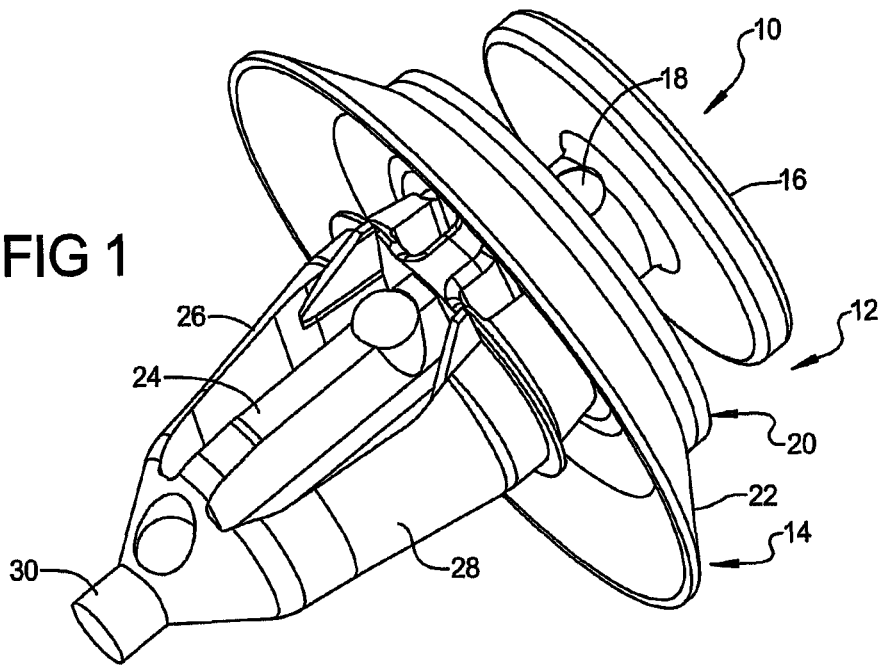
FIG. 1 is side perspective view of a trim fastener of the present disclosure.

Referring to FIG. 1, a fastener 10 includes a first fastener portion 12 connected to a second fastener portion 14. First fastener portion 12 is made, for example, using an injection molding process from a first polymeric material which is substantially rigid, such as polyoxymethylene. The second fastener portion 14 is made from a second resilient polymeric material in a second shot of a two-shot injection molding process, such that the material or surfaces of second fastener portion 14 in direct contact with corresponding material or surfaces of first fastener portion 12 are physically bonded. This bonding or connection commonly results from the temperature of the two-shot molding process. A fluid such as air or water can therefore not pass between the bonded, contacting surfaces of first and second fastener portions 12, 14, and the connection also mitigates noise and vibration transmission into and from the fastener 10.

Fastener 10 further includes a component engagement head 16 which according to several embodiments is circular, but is not limited to any geometric shape. The engagement head 16 is separated using a neck 18 from a planar face 20 of second fastener portion 14. According to several embodiments neck 18 has a smaller diameter than a diameter of engagement head 16. Second fastener portion 14 provides a first resilient seal member 22, which can take the form of an umbrella, and is elastically, resiliently flexible to create a seal when fastener 10 is used. A central post 24 of first fastener portion 12 is integrally connected to neck 18 and extends through and is connected to a portion of second fastener portion 14 during the molding process. Positioned on opposite sides of central post 24 are each of a first and second deflecting wing 26, 28. An insertion leading end 30 extends axially from and defines a free end of central post 24.

Figure 2:
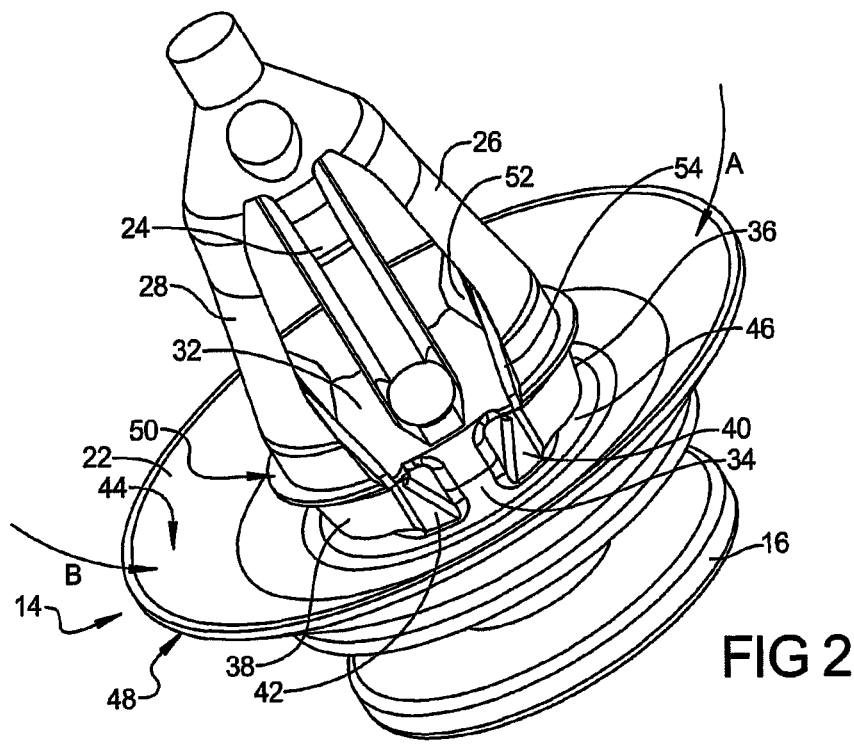
FIG. 2 is a bottom perspective view of the trim fastener of FIG. 1.

Referring to FIG. 2, second fastener portion 14 further includes a second resilient seal member 32 integrally connected to second fastener portion 14 and positioned oppositely about second resilient seal member 22 with respect to component engagement head 16. Second resilient seal member 32 provides a post enclosure element 34 which surrounds and is integrally connected to central post 24 for a portion of central post 24 that extends through second fastener portion 14. Second resilient seal member 32 further includes a first wing enclosure element 36 which receives and engages an end of first deflecting wing 26. Similarly, a second wing enclosure element 38 of second resilient seal member 32 receives and engages an end of second deflecting wing 28.

Each of the first and second deflecting wings 26, 28 are deflectable toward central post 24 from the non-deflected condition shown to permit the first and second deflecting wings 26, 28 to enter into an aperture created in a panel, shown and described in reference to FIG. 8. To permit this displacement or elastic deflection of first and second deflecting wings 26, 28, while also providing a fluid-tight seal at the ends of first and second deflecting wings 26, 28, a first through bore 40 and a second through bore 42 are provided. First deflecting wing 26 can elastically deflect in a first wing deflection direction "A" toward central post 24. To permit this deflection, material of first deflecting wing 26, as well as material of first wing enclosure element 36, can elastically deflect into first through bore 40 and then return to the non-deflected condition shown when installation of fastener 10 is complete. Similarly, material at a free end of second deflecting wing 28, that is received and engaged by material of second wing enclosure element 38, can together with a portion of the material of second wing enclosure element 38 deflect elastically into second through bore 42. First and second through bores 40, 42 therefore provide open space for elastic deflection of the first and second deflecting wings 26, 28 while simultaneously providing for a fluid-tight engagement between first and second deflecting wings 26, 28 and second resilient seal member 32.

First resilient seal member 22, as previously described, can include any of a curved, an umbrella or a concave shape collectively referred to as a concave seal surface 44 directed away from component engagement head 16. The geometry of concave seal surface 44 extends from an integral connection portion 46 created between second resilient seal member 32 and concave seal surface 44 and extending outwardly to a perimeter edge 48 of first resilient seal member 22. Perimeter edge 48 is shown for exemplary reasons having a circular shape, however perimeter edge 48 can also have an oval, obround, rectangular, or other geometric shape. According to several embodiments, second resilient seal member 32 can further include a substantially planar shaped extending flange 50 whose function will be better described in reference to FIG. 8.

Each of the first and second deflecting wings 26, 28 further include first and second retention elements 52, 54 which according to several embodiments are substantially triangular shaped and extend laterally, proximate to the connection positions between first and second deflecting wings 26, 28 and the individual first and second wing enclosure elements 36, 38. Portions of each of the first and second retention elements 52, 54 can extend beyond extending flange 50 and act as retention members helping to secure the installed position of fastener 10.

Referring to FIG. 3, first fastener portion 12 is shown prior to receiving the second shot molding of second fastener portion 14. In this condition, a seal member connection disk 56 is shown which subsequently receives a portion of second fastener portion 14. According to several embodiments, seal member connection disk 56 can have a circular, oval, or other geometric shape. Seal member connection disk 56 can further include a first disk portion 58 integrally connected to a second disk portion 60. According to several embodiments, first disk portion 58 is smaller in diameter or area than a diameter or area of second disk portion 60 such that a spaced step 62 is provided at a perimeter of first disk portion 58. Also visible in this view is a planar engagement face 64, 64' provided for each of the first and second retention elements 52, 52', 54, 54'. The planar engagement faces 64, 64' directly face the second disk portion 60 of seal member connection disk 56.

Referring to FIG. 4, first fastener portion 12 further includes a first wing extending member 66 extending from a free end of first deflecting wing 26 and directed toward second disk portion 60. Similarly, a second wing extending member 68 is integrally connected to and extends from a free end of second deflecting wing 28 and is oriented toward a disk face 70 of second disk portion 60. As evident from FIG. 4, each of the first and second retention elements 52, 52', 54, 54' are oriented toward each other and therefore substantially face central post 24.

Referring to FIG. 5, component engagement head 16 is separated from planar face 20 using neck 18 whose length can be predetermined to suit installation with a component such as a trim member shown and described in reference to FIG. 10. The extending flange 50 of second resilient seal member 32 directly faces the planar engagement face 64 of each of the first and second retention elements 52, 54. Central post 24 includes opposed post straight edges 72, 72' which are oriented substantially perpendicular to an orientation of component engagement head 16. Post straight edges 72, 72' in the non-deflected condition are oriented substantially parallel to each other. Each of the post straight edges 72, 72' transition into a post curved lead-in surface 74, 74' which together reduce central post 24 down to a diameter of insertion leading end 30.

Referring to FIG. 6 and again to FIG. 4, following the second shot molding process which positively engages all of the contacting surfaces of second fastener portion 14 to the corresponding contacted surfaces of first fastener portion 12, each of the first and second wing extending members 66, 68 are also embedded in and engaged by second resilient seal member 32. Each of the first and second deflecting wings 26, 28 further include a wing maximum extension portion 80, 80' which are opposed to each other and separate first and second deflecting wings 26, 28 from central post 24, thereby creating a first deflecting wing cavity 76 between first deflecting wing 26 and central post 24 and further creating a second deflecting wing cavity 78 between second deflecting wing 28 and central post 24. First and second deflecting wing cavities 76, 78 allow inward deflection of each of the first and second deflecting wings 26, 28. From the wing maximum extension portions 80, 80', a first wing taper edge 82, 82' tapers downwardly toward each of a wing minimum extension portion 84, 84'. A second wing taper edge 86, 86' thereafter transitions first and second deflecting wings 26, 28 from wing minimum extension portion 84, 84' to connect with insertion leading end 30. The first and second deflecting wings 26, 28 therefore create a taper or V-shape from wing maximum extension portion 80, 80' down to insertion leading end 30. This V-shape assists during installation of fastener 10 by reducing installation friction and gradually increasing the force acting on first and second deflecting wings 26, 28, causing their elastic inward deflection.

Referring to FIG. 7, the bonded and therefore substantially fluid-tight connections between first and second fastener portions 12, 14 are evident following the second shot molding process which installs second fastener portion 14. During the second molding shot, a retention portion 88 of first resilient seal member 22 is received in the spaced step 62, which opposes portions of second fastener portion 14 contacting and therefore bonded to disk face 70 of second disk portion 60. A perimeter wall 90 surrounds a disk perimeter wall 92 of second disk portion 60 and thereby integrally connects material of second fastener portion 14 between retention portion 88 and first resilient seal member 22.

Also during the second shot of the two-shot molding process, material of second fastener portion 14, defining post enclosure element 34, encompasses central post 24 and further encompasses each of the first and second wing extending members 66, 68. First and second wing enclosure elements 36, 38 are thereby bonded to first and second wing extending members 66, 68, respectively. The first and second through bores 40, 42, positioned between first and second wing extending members 66, 68 and central post 24, are also created at this time.

First deflecting wing 26 is integrally bonded or homogeneously connected to central post 24 at a first wing connection end 94. Second deflecting wing 28 is similarly connected using a second wing connection end 96. The first and second wing connection ends 94, 96 therefore provide the point of axial rotation for the first and second deflecting wings 26, 28 in the individual first and second wing deflection directions "A", "B". Deflection toward the central post 24 by each of the first and second deflecting wings 26, 28, is aided by the provision of first and second through bores 40, 42 which temporarily receive material of first and second wing enclosure elements 36, 38 as first and second wing extending members 66, 68 rotate in the first and second wing contracting directions "A", "B". The size of first and second through bores 40, 42 is therefore selected to permit deflection of each of the first and second deflecting wings 26, 28 while also retaining sufficient material in first and second wing enclosure elements 36, 38 to provide an elastic rebound force following installation of fastener 10.

Referring to FIG. 8, fastener 10 can be inserted in an installation direction "C" through an aperture defined by a panel aperture wall 98 created through a panel 100, and displaced until the first resilient seal member 22 contacts and elastically deflects against a first panel face 102 of panel 100. This elastic deflection of first resilient seal member 22 creates a fluid-tight boundary at first panel face 102. As previously noted, during installation of fastener 10, each of the first and second deflecting wings 26, 28 individually deflect in the first and second opposed wing deflection directions "A", "B", compressing material of first and second wing enclosure elements 36, 38 into each of the first and second through bores 40, 42. This inward deflection of the first and second deflecting wings 26, 28 permits the wing maximum extension portions 80, 80' to slide through and past panel aperture wall 98 until the elastic compression force created by deflecting first and second wing enclosure elements 36, 38 acts to return the first and second deflecting wings 26, 28 in either a first wing expansion direction "D" or a second wing expansion direction "E". At this time, wing maximum extension portions 80, 80' are positioned in contact with a second panel face 104 of panel 100. Also during fastener installation, material of second fastener portion 14, at each of a first compression zone 106 and a second compression zone 108, is elastically compressed thereafter creating a fluid boundary between second resilient seal member 32 and panel aperture wall 98. Extending flange 50 of second resilient seal member 32 is also positioned below second panel face 104 in the installed position and thereby resists transfer of fluid located at a second panel face 104 side of panel 100 from moving past panel aperture wall 98.

Figure 9:
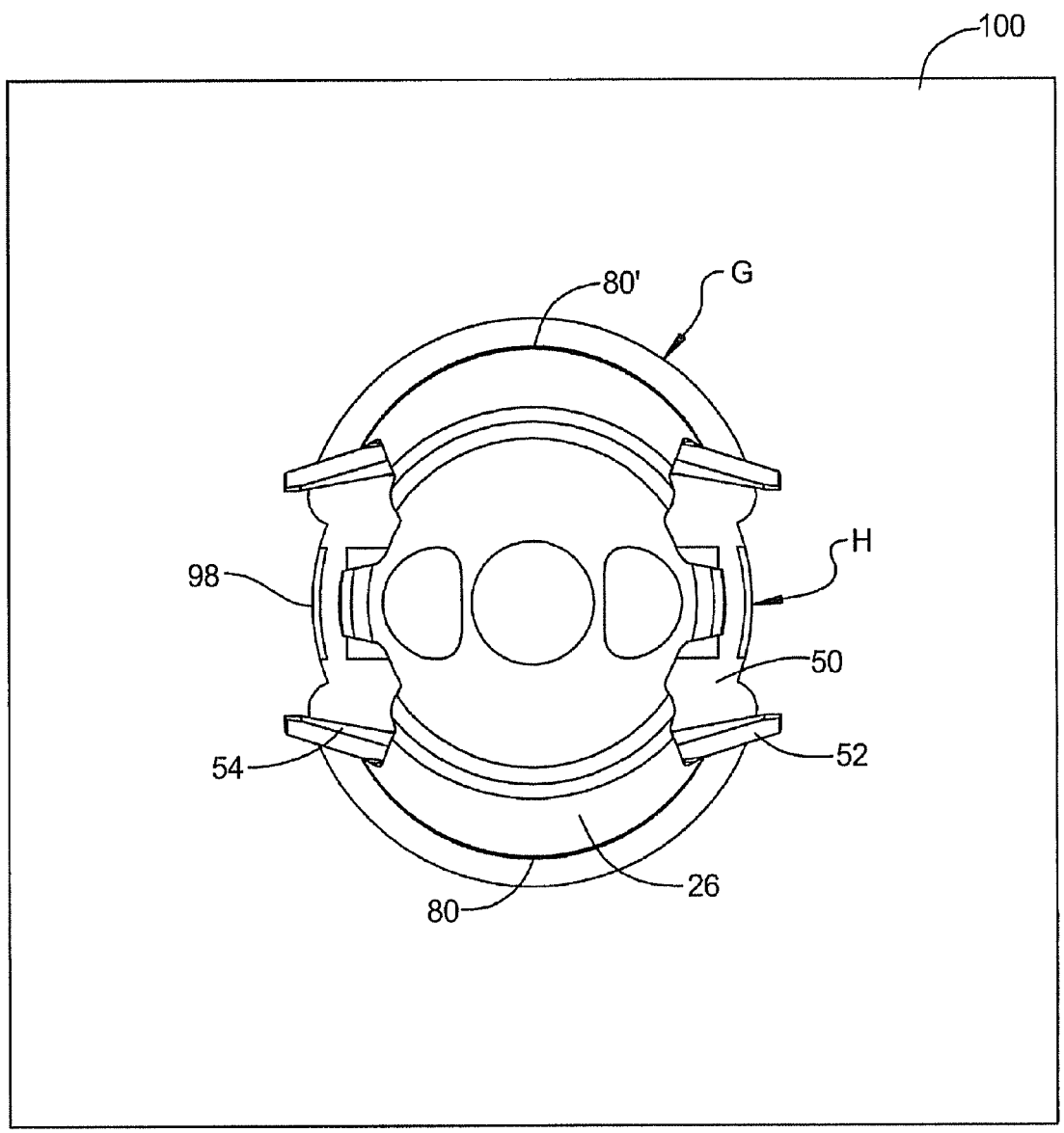
FIG. 9 is a bottom plan view of the fastener installation of FIG. 8.

Referring to FIG. 9, after fastener 10 is fully inserted and reaches an installed position with respect to panel 100, the extending flange 50 substantially covers the aperture created in panel 100 defined by panel aperture wall 98. The first and second retention elements 52, 52', 54, 54' extend beyond the panel aperture wall 98 and thereby provide resistance to pullout of fastener 10 after reaching the installed position. The tendency of each of the first and second deflecting wings 26, 28 to resist deflection also enhances the ability of fastener 10 to resist pull out.

Referring to FIG. 10, following installation of fastener 10 into the aperture of panel 100, a trim member or similar component 110 can be engaged to the component engagement head 16 of fastener 10. Component 110 includes an aperture 112 which is smaller than a diameter of component engagement head 16 yet larger than a diameter of neck 18, such that component 110 is trapped or engaged between planar face 20 of second fastener portion 14 and a head contact surface 114 of component engagement head 16. As previously noted, extending flange 50 of second resilient seal member 32 resists transfer of fluids from a second panel face 104 side of panel 100 toward the first panel face 102 side of panel 100. The seal created between first resilient seal member 22 and the first panel face 102 resists entrance of fluid between these two members, thereby creating a seal cavity 116 which permits continued flexure of first resilient seal member 22 while maintaining the resilient seal with respect to first panel face 102.

With continuing reference to FIGS. 1-10, a trim fastener system 118 therefore provides a trim fastener 10 with first fastener portion 12 including post 24, and first and second deflecting wings 26, 28 connected to the end 30 of the post 24. Each of the first and second deflecting wings 26, 28 are elastically deflectable (in the first and second deflection directions "A" or "B") toward the post 24, and each has a wing extending member 66, 68. Using a second shot of a 2-shot molding process, the elastically compressible resilient material second fastener portion 14 is fixedly connected to the first fastener portion 12. The second fastener portion 14 includes first and second wing enclosure elements 36, 38 connected to the extending member 66, 68 of each of the first and second deflecting wings 26, 28. First and second through bores 40, 42 are oppositely positioned about the post 24.

The vehicle panel 100 has aperture 112 created therein defining panel aperture wall 98. Fastener 10 is aligned so the insertion leading end 30 is directed into aperture 112 and fastener 10 is then moved in the installation direction "C" to insert post 24 and first and second deflecting wings 26, 28 through aperture 112. The first and second deflecting wings 26, 28 and the second fastener portion 14 deflect elastically toward the post 24 when in contact with the panel aperture wall 98 during insertion into the aperture 112. The first and second through bores 40, 42 of the second resilient seal member 32 provide available open space and temporarily collapse (opposed outer walls of the through bores 40, 42 approach and/or contact each other) to permit each of the first and second through bores 40, 42 to receive a portion 36a, 38a of one of the first and second wing enclosure elements 36, 38 during wing deflection.

Fastener 10 insertion continues in the installation direction "C" until first resilient seal member 22 contacts first panel face 102 of panel 100 thereby creating a fluid seal at the contact/intersection of the perimeter edge 48 of first resilient seal member 22 and first panel face 102. After the wing maximum extension portion 80, 80' of each of the first and second deflecting wings 26, 28 passes through aperture 112, the first and second deflecting wings 26, 28 thereafter elastically return in the first and second wing expansion directions "D" and "E" to their non-deflected condition (shown in FIGS. 1-8). The wing maximum extension portions 80, 80' in their non-deflected condition extend beyond panel aperture wall 98 and therefore frictionally retain the trim fastener in contact with a second side or second panel face 104 of the panel 100. The elastically deflectable material of first and second wing enclosure elements 36, 38 that is positioned outward of first and second wing extending members 66, 68 elastically compresses against panel aperture wall 98, thereby creating a frictional retention force acting parallel to panel 100 to assist the retention action of wing maximum extension portions 80, 80'.

The second resilient seal member 32 includes extending flange 50 which is oriented parallel to the engagement head 16 and is therefore oriented substantially parallel to panel 100. A rim or edge of the extending flange 50 extends outwardly past the first and second wing enclosure elements 36, 38 and therefore deflects by contact with panel aperture wall 98 when the second resilient seal member 32 is inserted through aperture 112. Referring more specifically again to FIG. 9, an area "G" of extending flange 50 is greater than an area "H" (defined for example by a diameter) of the aperture 112 in panel 100, such that the positioning of extending flange 50 proximate to aperture 112 restricts or minimizes a fluid path "F" (shown in FIG. 10) for fluid at or near the second panel face 104 side of panel 100 from entering aperture 112. The first and second retention elements 52, 52', 54, 54' of the first and second deflecting wings 26, 28 deflect elastically toward each other when contacting panel aperture wall 98, and thereafter return to their non-deflected conditions shown in FIGS. 1-8. A taper shape of each first and second retention element 52, 52', 54, 54' helps deflect the retention elements during insertion of fastener 10. A portion of each first and second retention element 52, 52', 54, 54' extends past extending flange 50 and therefore extends outwardly past panel aperture wall 98 in the installed and substantially non-deflected condition to also aid in retaining fastener 10 in contact with panel 100. A limited inward deflection of first and second deflecting wings 26, 28 can also be retained in the fastener installed position to further assist in fastener retention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A trim fastener, comprising:
   a first fastener portion including:
      a component engagement head connected to a post; and
      first and second deflecting wings connected to an end of the post opposite to the head, each elastically deflectable toward the post and having a wing extending member facing the engagement head; and
   a resilient material second fastener portion connected to the first fastener portion, including:
      first and second wing enclosure elements connected to the wing extending member of each of the first and second deflecting wings;
      first and second through bores oppositely positioned about the post each temporarily receiving a portion of one of the first and second wing enclosure elements when the first and second deflecting wings elastically deflect toward the post;
      a first resilient seal member; and
      a second resilient seal member integrally connected to a seal surface of the first resilient seal member, the second resilient seal member including the first and second wing enclosure elements and the first and second through bores;
   wherein the second resilient seal member includes an extending flange oriented parallel to the engagement head, the extending flange extending outwardly past the first and second wing enclosure elements.

2. A trim fastener, comprising:
   a first fastener portion including:
      a component engagement head connected to a post; and
      first and second deflecting wings connected to an end of the post opposite to the head, each elastically deflectable toward the post and having a wing extending member facing the engagement head; and
   a resilient material second fastener portion connected to the first fastener portion, including:
      first and second wing enclosure elements connected to the wing extending member of each of the first and second deflecting wings; and
      first and second through bores oppositely positioned about the post each temporarily receiving a portion of one of the first and second wing enclosure elements when the first and second deflecting wings elastically deflect toward the post; and
      an extending flange oriented parallel to the engagement head, the extending flange extending outwardly past the first and second wing enclosure elements;
   a first resilient seal member having a concave seal surface; and
   a second resilient seal member integrally connected to a seal surface of the first resilient seal member, the second resilient seal member having the first and second wing enclosure elements and the extending flange formed integrally therewith, and the first and second through bores;
   the first and second wing enclosure elements and the first and second through bores positioned between the seal surface of the first resilient seal member and the extending flange of the second resilient seal member.

3. The trim fastener of claim 2, wherein the second fastener portion includes a post enclosure element encircling a portion of the post, the first and second through bores being oppositely positioned about the post and the post enclosure portion, the first and second through bores and the post enclosure element each positioned between the seal surface of the first resilient seal member and the extending flange of the second resilient seal member.

4. A trim fastener, comprising:
   a first fastener portion including:
      a component engagement head connected to a post; and
      first and second deflecting wings connected to an end of the post opposite to the head, each elastically deflectable toward the post and having a wing extending member facing the engagement head; and
   a resilient material second fastener portion connected to the first fastener portion, including:
      first and second wing enclosure elements connected to the wing extending member of each of the first and second deflecting wings;
      first and second through bores oppositely positioned about the post each temporarily receiving a portion of one of the first and second wing enclosure elements when the first and second deflecting wings elastically deflect toward the post;
      an extending flange oriented parallel to the engagement head, the extending flange extending outwardly past the first and second wing enclosure elements; and
   the first and second deflecting wings each including a retention element having a planar engagement face contacting the extending flange and extending outwardly past the extending flange.

5. A trim fastener, comprising:
   a first fastener portion including:
      a post; and
      first and second deflecting wings connected to an end of the post, each having a wing extending member, the first and second deflecting wings being elastically deflectable toward the post;

a second fastener portion connected to the first fastener portion, including:
a first resilient seal member; and
a second resilient seal member integrally connected to a seal surface of the first resilient seal member, the second resilient seal member including:
first and second wing enclosure portions connected to the wing extending members of the first and second deflecting wings; and
first and second through bores oppositely positioned about the post, each temporarily collapsing when receiving portions of the first and second wing enclosure portions when the first and second deflecting wings elastically deflect toward the post;
a seal member connection disc integrally connected to the first fastener portion having a spaced step; and
a retention portion of the first resilient seal member integrally connected to the spaced step.

6. The trim fastener of claim 5, wherein the first resilient seal member includes a concave-shaped seal surface having the first and second wing enclosure portions integrally connected to the seal surface.

7. The trim fastener of claim 6, wherein the second resilient seal member includes a post enclosure element encircling a portion of the post, the first and second through bores being oppositely positioned about the post and the post enclosure portion.

8. The trim fastener of claim 7, wherein the second resilient seal member further includes an extending flange, the first and second through bores and the post enclosure element each positioned between the seal surface of the first resilient seal member and the extending flange of the second resilient seal member.

9. The trim fastener of claim 5, wherein the first fastener portion includes a component engagement head oriented perpendicular to the post, having the wing extending member of the first and second deflecting wings directed toward the engagement head.

10. A trim fastener system, comprising:
a trim fastener, including:
a first fastener portion including:
a post; and
first and second deflecting wings connected to an end of the post, each elastically deflectable toward the post and having a wing extending member; and
an elastically compressible resilient material second fastener portion connected to the first fastener portion, including:
first and second wing enclosure elements connected to the wing extending member of each of the first and second deflecting wings; and
first and second through bores oppositely positioned about the post;
a first resilient seal member; and
a second resilient seal member integrally connected to a seal surface of the first resilient seal member, the second resilient seal member including first and second wing enclosure elements and first and the second through bores; and
a vehicle panel including an aperture created therein having a panel aperture wall, the first and second deflecting wings and the second fastener portion when in contact with the panel aperture wall during insertion into the aperture deflecting elastically, the first and second through bores temporarily collapsing to each receive a portion of one of the first and second wing enclosure elements during wing deflection, the first and second deflecting wings thereafter elastically returning to a non-deflected condition after a wing maximum extension portion of each of the first and second deflecting wings passes through the aperture, the wing maximum extension portions thereafter frictionally retaining the trim fastener in contact with the panel;
wherein in an installed condition of the trim fastener the first resilient seal member contacts a first side of the panel creating a fluid seal between the first resilient seal member and the first side of the panel preventing passage of a fluid through the aperture.

11. The trim fastener system of claim 10, wherein the second resilient seal member further includes an extending flange oriented parallel to the engagement head, the extending flange extending outwardly past the first and second wing enclosure elements and facing a side of the panel.

12. The trim fastener system of claim 11, wherein the extending flange has an area greater than an area of the aperture created in the panel, the extending flange thereby inhibiting fluid impinging on the extending flange from entering the aperture.

13. The trim fastener system of claim 10, wherein the first fastener portion further includes a component engagement head connected to and oriented perpendicular to the post, the wing extending member of each of the first and second deflecting wings facing the engagement head.

* * * * *